May 24, 1938.  L. H. BENNION ET AL  2,118,393
COUNTER MOLDING MACHINE
Filed Oct. 22, 1937
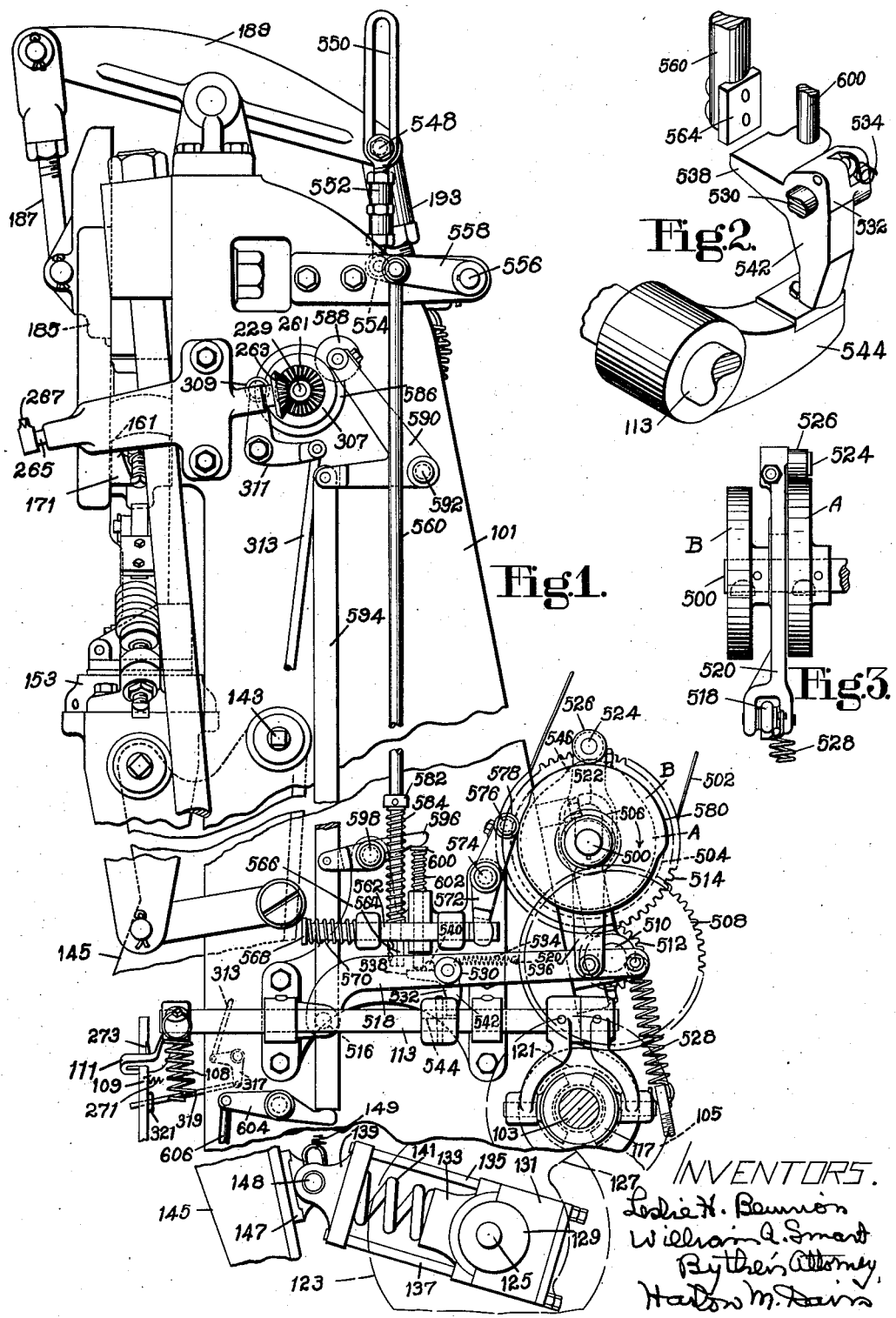

Patented May 24, 1938

2,118,393

UNITED STATES PATENT OFFICE 2,118,393

COUNTER MOLDING MACHINE

Leslie Hugh Bennion and William Arnold Smart, Leicester, England

Application October 22, 1937, Serial No. 170,495
In Great Britain June 17, 1936

5 Claims. (Cl. 12—64)

This invention relates to machines for molding shoe parts and is herein illustrated as embodied in a machine for molding heel-stiffeners or counters of the type disclosed in United States Letters Patent No. 1,742,300, granted January 7, 1930, on application of L. H. Bennion.

Machines of the type referred to comprise male and female molds relatively movable to shape the body portion of a counter blank positioned between them, and a flange former movable across the faces of the molds to form flanges upon the blank. The male mold is usually actuated by a heavy lever connected to an eccentric on a drive shaft by a yieldable connection which causes the lever to advance the male mold in two separate movements, followed by operation of the flange former, after which the drive shaft is disconnected from its source of power and its direction of rotation is reversed under the action of a spring and weight to cause the male mold and other parts to return to their initial operative positions. Counter molding machines driven in this manner have been successfully operated and stand up well under the rough usage to which they are subjected. However, in the operation of such a machine it has been necessary to stop the machine between operations performed upon successive blanks and considerable skill has been required upon the part of the operator to release the drive shaft at the proper time so that the parts will stop in operative position for the presentation of the next blank. Other forms of drive mechanisms for machines of this type have been devised some of which cause the drive shaft to rotate continuously in the same direction. However, such mechanisms have not proved to be satisfactory.

In view of the foregoing, it is an object of the present invention to provide in a machine of the type referred to improved mechanism for causing successive repetitions of the cycle of operation of the machine thereby to relieve the operator of the necessity for actuating a clutch between operations upon successive blanks, and, at the same time, to provide mechanism which will stop the operating parts in proper position for the presentation of blanks.

To this end, and as shown, the invention provides a counter molding machine in which there is molding means, driving means for the molding means, a clutch for operatively connecting the driving means to the molding means, a cam for causing engagement of the clutch, and means operated by a part of the machine movable to engage the work for causing disengagement of the clutch, together with a cam effective to render the clutch disengaging means operable only at a predetermined stage in the cycle of operation of the machine.

Preferably, the cam for causing engagement of the clutch is continuously driven thus to initiate repetitions of the operation of the machine without intervention of the operator, and the cam for operating the clutch disengaging means is so timed that the clutch will be disengaged at the proper time to cause the operating parts to stop in their predetermined operative positions between successive cycles.

These and other features of the invention are disclosed in the following detailed specification and in the accompanying drawing, and are pointed out in the appended claims.

In the drawing,

Fig. 1 is a view in side elevation of a portion of a machine illustrative of one embodiment of the invention;

Fig. 2 is a prespective view of a portion of the latch mechanism of Figure 1; and Fig. 3 is a rear view of the cam mechanism illustrated in Fig. 1.

As shown in Fig. 1, the illustrated machine comprises a heel shaped male mold 161 adapted to be moved in a height-wise direction to mold a counter blank positioned between it and a two part female mold 171, 173 and a flange former 185 arranged to move across the faces of the molds to form flanges on the counter blank.

The male mold 161 is raised by means of a large rocking lever 145 which is mounted upon a pivot 143 and supports at its forward upper end a table 153 which carries the male mold 161. At the rear surface of the lower part of the lever 145 is a guideway for a sliding block 147 which is pivotally connected at 148 with an end-piece 139 fixed to bolts 135, 137 upon which are mounted blocks 131, 133 which are pressed by a heavy compression spring 141 frictionally to embrace an eccentric 129 on a drive shaft 125. The machine has a treadle rod 109 depression of which operates a clutch 117 to secure a shaft 103 to a constantly rotating pulley 105, thereby to drive the shaft 103 and also, through gears 121, 123, the shaft 125. During the first part of the rotation of the shaft 125 the frictional grip of the blocks 131, 133 on the eccentric 129 causes the blocks to rotate with the eccentric and the sliding block 147 is carried downwardly to the foot of its guideway on the lever 145, thereby rocking the lever 145 to cause the male mold 161 to rise upwardly into the female mold 171, 173. On further rotation of the shaft 125 the blocks 131, 133 slip on the eccentric and through the parts described the lever 145 is given an additional rocking movement to give an additional upward movement to the male mold 161 during which the female mold 171, 173, having closed during the first main upward movement of the male mold, yields upwardly. Immediately after this further upward movement of the male mold the flange former 185, actuated by a rod 193 which is pivotally connected to the gear 123 on the shaft 125, will have descended sufficiently in its reciprocatory movement to operate upon the counter blank. As long as the shaft 125 continues to rotate, it reciprocates the male mold 161 in its secondary movement and also reciprocates the flange former 185. When the shaft 125 is disconnected from its driving means a spring 149 in conjunction with a weight 127, carried in an offset position on the gear 123 on the shaft 125, lifts the sliding block 147 to its uppermost position, thereby rocking the lever 145 to lower the male mold 161, the shaft 125 turning somewhat in the direction reverse to its driving direction.

The parts thus far described are similar in construction and in operation to the corresponding part shown in the machine described in the aforementioned Letters Patent No. 1,742,300 to which reference may be had for a detailed description not herein set forth.

Mechanism is provided to relieve the operator of the necessity for actuating a clutch treadle to cause repetition of the cycle of operations and to cause the stopping of the operating parts between cycles in proper position for the insertion of a fresh counter blank. This mechanism includes a cam shaft 500 mounted in bearings at the rear portion of the machine and extending in a direction transverse of the machine. The cam shaft 500 is rotated at a constant speed by a belt 502 which passes around a pulley 504 freely rotatable on the shaft 500. The pulley has secured thereto a small pinion 506 which meshes with a gear 508 fixed on a shaft 510 mounted in bearings in the machine frame. The shaft 510 also has fixed thereto a pinion 512 which meshes with a gear 514 fixed to the shaft 500. The arrangement described effects rotation of the shaft 500 at a considerably reduced speed as compared with the pulley 504 and enables the same factory shafting to be employed for driving the shafts 103 and 500 without pulleys of excessive difference in size being employed on the shafting. The cam shaft 500 is located above the level of a rockshaft 113 and lies more or less in the same vertical plane as the shaft 103. On the cam shaft are two cams, a cam, which may be referred to as A, which is operative as hereinafter described to cause engagement of the said clutch of the machine and a cam, which may be referred to as B, which is operative as hereinafter described to control disengagement of the said clutch by movement of the flange former 185 of the machine. Pivoted at its forward end at 516 to the frame of the machine and extending rearwardly from such pivot in a substantially horizontal direction is a lever 518 which is pivoted at its rearward end to the lower end of an upstanding link 520 through a slot 522 in the upper end portion of which passes the shaft 500. The link 520 has a laterally projecting stud 524 fixed thereto at its upper end and on this stud there is mounted a cam roll 526 which bears against the peripheral surface of the cam A being held thereagainst by means of a tension spring 528 which is connected to the machine frame at its lower end and to the rear end of the lever 518 at its upper end. Pivotally mounted on a stud 530 laterally projecting from the lever 518 at its middle portion is a two armed latch 532. A tension spring 534 connected between the latch 532 and a pin 536 on the lever 518 normally serves to hold the latch in a position in which its upper arm 538 is more or less horizontal and bears against a stop-pin 540 on the lever 518 while its lower arm 542 is more or less vertical and overlies an arm 544 secured to and projecting from the left from the rockshaft 113. The main portion of the periphery of the cam A is circular but the remainder of the periphery of the cam constituting about ⅙ of the periphery, forms an elevation 546 on the periphery. The arrangement is such that when the cam roll 526 is at the said elevation on the periphery the rear end portion of the lever 518 carrying the latch 532 is raised and the latch overlies but does not depress the arm 544 on the rockshaft 113. In this position of the parts the clutch between the pulley 105 and the shaft 103 is disengaged. When, however, the cam A rotates, the cam roll 526 tracks on to the main part of the periphery of the cam A and the rear end portion of the lever 518 is lowered by the action of the spring 528. This causes the latch 532, which is then prevented from rotating clockwise as looked at from the right by the pin 540 already referred to on the lever, to depress the arm 544 on the rockshaft 113, effecting counterclockwise movement, as looked at from the front of the machine, of the rockshaft and engagement of the clutch which will remain engaged, while the main part of the periphery of the cam A rotates past its cam roll, until the latch 532 is displaced as will soon be explained to allow the arm 544 on the rockshaft 113 to rise and the clutch to be disengaged.

The flange former 185 is operated by means of an adjustable rod 187 pivoted to the forward end of a lever 189 which is pivoted to the frame near its middle portion and at its rear end has a rod 193 pivotally connected to it, the rod 193 at its lower end being connected to an eccentric pin (not shown) carried by the gear 123 on the drive shaft 125. In the illustrative arrangement now being described the pivot pin 548 by which the rod 193 is connected with the lever 189 is laterally extended to enter a slot 550 in the upper end portion of an adjustable link 552 which is pivotally connected at its lower end to an arm 554 fixed to and projecting forwardly from an end portion of a horizontal rockshaft 556 which extends transversely of the machine and is mounted in suitable bearings near the top of the machine frame. A second arm 558 is fixed to and projects forwardly from the rockshaft 556, this second arm being located near the right hand end of the rockshaft. To this second arm 558 is pivotally connected the upper end of a substantially vertical rod 560 which passes downwardly through a bore in a horizontal slidable bar 562 arranged parallel or substantially so to the rockshaft 113 and which has at its lower end a head 564 adapted, when the rod 560 is moved downwardly and when the position of the slidable bar 562 is such as to allow this to happen, to depress the upper arm 538 of the latch 532. This will turn the latch 532 counterclockwise, as looked at from the right-hand side of the machine, causing, assuming that the cam A has previously operated to cause the latch 532 to depress the arm 544 on the rockshaft 113 to cause engagement of the aforesaid clutch, the lower arm 542 of the latch 532 to be swung out of engagement with the arm 544 on the rockshaft 113, allowing the arm 544 to rise under tension of a spring 108 and the clutch 117 to be disengaged. The position of the slidable bar 562 is controlled by means of the cam B. The bar extends in a direction forwardly and rearwardly of the machine and is mounted for horizontal sliding movement in bearings in a fixed bracket 566 secured to the machine frame. At its forward end the bar 562 has a head 568 fixed thereon and between this head and the bracket 566 is housed a compression spring 570 which surrounds the bar. At its rearward end the bar 562 has a recessed portion which is embraced by the forked lower end of a lever 572 which is pivoted near its middle portion on a fixed pivot 574 on the fixed bracket 566 and at its upper end carries a stud 576 on which is mounted a cam roll 578 which bears against the periphery of the cam B, the compression spring 570 serving to maintain the cam roll 578 pressed against the periphery of the cam B. The periphery of the cam B is of a generally circular shape but has a raised portion 580 occupying about nearly half of the periphery. The arrangement is such that when the cam roll 578 is engaging the main, or low, part of the cam B the bar 562 is maintained in a forward position such that the head 564 at the lower end of the rod 560 is retained in a position forward of the arm 538 of the latch 532 and so cannot engage this arm of the latch to allow disengagement of the clutch. When, however, the cam roll 578 reaches the raised portion 580 of the cam B the slidable bar 562 is moved rearwardly so that the head 564 of the rod 560 is brought into position over the arm 538 of the latch 532 and subsequent depression of the rod 560 is effective to swing the latch to allow disengagement of the clutch. The rod 560 has a collar 582 fixed thereon a short distance above the locality at which it passes through the bore in the slidable bar 562. Between the lower surface of this collar and the upper surface of the slidable bar 562 is housed a compression spring 584 which surrounds the rod 560 and serves to urge it upwardly and normally maintain it in a position in which the head 564 of the rod engages the lower surface of the slidable bar. The arrangement is such that when during the operation of the machine the flange former 185 reciprocates, during the major portion of the movement of the flange former the pivot pin 548 at the rearward end of the lever 189 tracks idly in the slot 550 in the link 552 but that when the flange former 185 is approaching the top of its stroke (i. e., when the rearward end of the lever 189 is approaching the bottom of its stroke) the pivot pin 548 engages the bottom of the slot 550 and serves to depress the link 552 and so, through the parts described, to depress the rod 560.

Considering now in greater detail the operation of the parts above described, the cam shaft 500 carrying the cams A and B will be assumed to be constantly rotating, conveniently at about 12 to 16 R. P. M. It will also be assumed that the clutch 117 is disengaged. As the cam A tracks round against its cam roll 526 the clutch will be engaged, on account of the depression by the latch 532 of the arm 544 on the rockshaft 113, when the cam roll 526 moves down the downward slope at the end of the elevation 546 on the periphery of the cam A. The driving shaft 125 will then begin to rotate and the lever 145 will be rocked first to raise the male mold 161, the sliding block 147 moving down to the foot of its guideway, and then with a secondary motion due to the eccentric 129 to apply full molding pressure to a blank between the molds, and the flange former 185, after having stopped in a raised position at the end of the previous operation, will be reciprocated. On the first downward and upward movement of the flange former 185 the cam B will be engaging its cam roll 578 with its low portion and thus, though when the flange former is near the end of its upward stroke the pivot pin 548 at the rearward end of the lever 189 will depress the slotted link 552 causing depression of the rod 560, the head 564 at the lower end of the rod 560 will not engage the arm 538 of the latch 532 to allow disengagement of the clutch since the slidable bar 562 will be in its forward position. However, when in the continued operation of the machine the flange former 185 has performed its second wipe and is approaching the upper limit of its stroke the slidable bar 562 will by this time have been moved rearwardly owing to the high part 580 of the cam B having reached its cam roll 578 and consequently on the second downward movement of the head 564 at the lower end of the rod 560 the head will engage the arm 538 of the latch 532 swinging the latch aside and permitting the arm 544 on the rockshaft 113 to rise to disengage the clutch. Shortly after the clutch disengagement the cam roll 526 engaging the cam A will reach the beginning of the elevation 546 on the cam A causing the lever 518 carrying the latch 532 to rise and allowing the latch to swing, in a clockwise direction as looked at from the righthand side, so that the lower arm 542 of the latch comes once more into position over the arm 544 on the rockshaft 113 ready for the next cycle of operation. The speed of rotation of the cam shaft 500 carrying the cams A and B will be in such relation to the speed of rotation of the pulley 105 that sufficient time will elapse between the disengagement of the clutch and the inauguration of the next cycle by the end of the elevation 546 on the cam A reaching the cam roll 526 to allow the completion of the "running back" motion of the drive shaft 125, so that the parts will be in proper position with the male mold 161 lowered by the time the clutch is next tripped.

The illustrative machine is provided with a picker arm 267 which is effective to doff a counter from the male mold 161 after it has been molded by the machine. The picker arm is secured to the end of a shaft 265, mounted in a bracket fixed to the machine frame, and the shaft 265 has fixed to it at its rearward end a bevel gear 263 which meshes with a bevel gear 261 secured to the right hand end portion of a shaft 229 which is rotated at intervals in the manner described in said Letters Patent No. 1,742,300.

The rockshaft 113 has fixed thereto a lever 111 through a slot in which the treadle rod 109 passes, the rod having a catch piece 273 above the slot. A spring 271 tends normally to hold the rod 109 in rearward position so that the catch piece 273 engages the lever 111. The machine may be started by means of the treadle rod 109 if it is desired to do so for any reason at a time when the cam shaft 500 is not being rotated. The shaft 229 carries a disk 307 having a depression therein within which, when the machine is running and the shaft 229 is stationary, rests a cam roll 309 carried upon the vertical arm of a bell crank lever 311. The horizontal arm of this lever is connected by a rod 313 to a second bell crank lever 317 which in turn is connected to a rod 319 that passes through a hole in the treadle rod 109 and has a collar 321 bearing against the rear of the treadle rod. The arrangement is such that when the picker arm 267 is in anything but its rest position, i. e., when the cam roll 309 engages in the depression in the disk 307, the rod 319 maintains the treadle rod 109 in a forward position and thus renders the catch piece 273 inoperative for engagement with the lever 111.

Mechanism is also provided in the illustrative machine for enabling the clutch of the machine to be thrown out at any time after it has been operated by the lever 518, after the latter has been depressed, if the operator desires for any reason to stop the operation of the machine, and mechanism is also provided for preventing clutching of the machine by depression of the lever 518 except when the picker arm 267 is in its rest position. With these purposes in view the following parts are provided. The shaft 229 carries a second disk 586 located to the left of the disk 307. The disk 586 has a depression, in which there is engaged, when the picker arm 267 is in its rest position, a cam roll 588 carried on one arm of a bell-crank lever 590 pivoted at 592 on the machine frame. The other arm of the bell-crank lever 590 has connected to it the upper end of a link 594. Pivoted to the link 594 is the forward end of a lever 596 which is pivoted near its middle to the fixed bracket 566 on a stud 598. The rearward end portion of the lever 596 overlies the upper end of a vertical rod 600 slidably mounted in a bore in the bracket 566. A compression spring 602 housed between a head at the upper end of the rod 600 and the bracket 566 maintains the rod 600 thrust upwardly into engagement with the lever 596. The lower end of the rod 600 overlies the arm 538 of the latch 532. When the cam roll 588 is engaged in the depression in the disk 586, i. e., when the picker arm 267 is in its initial rest position, the rod 600 does not interfere with the arm 538 of the latch. When, however, the cam roll 588 is moved out of the depression in the disk 586 the rod 600 is depressed and thereby turns the latch counter-clockwise (as looked at from the right-hand side) and causes the arm 542 of the latch to be swung aside from the arm 544. Thus should, in the operation of the machine, the picker arm 267 become jammed in a position other than its initial position, the parts just described prevent the machine again being clutched until the picker arm has been released. Pivotally mounted near its middle on the frame of the machine is a lever 604 the forward end portion of which is connected to a treadle rod 606 and the rearward end portion of which underlies the lower end of the link 594. A treadle is connected to the treadle rod 606 and depression of this treadle is effective, at any time during the operation of the machine to raise the link 594 which in turn will depress the rod 600 through the lever 596 to swing the latch 532 so that its arm 542 is moved away from the arm 544 and the last named arm is permitted to rise to disengage the clutch should it be desired to stop the machine on account of faulty blank insertion in the molds or for any other reason.

Having described our invention, what we claim as new and desire to secure by Letters Patent of the United States is:

1. A counter molding machine comprising molding means, driving means, a clutch for operatively connecting the driving means to the molding means, a continuously driven cam for causing engagement of the clutch, means operated by a part of the machine which is movable to engage the work for disengaging the clutch, and a second cam operative to render the clutch disengaging means effective only at a predetermined stage in the operation of the machine.

2. A counter molding machine comprising a plurality of molds, driving means for causing relative movement of the molds to shape a counter blank positioned between the molds, a clutch effective when engaged to couple the driving means to the molds, automatic means for causing engagement of said clutch, means operated by a part of the machine which is movable to operate upon the work for causing disengagement of said clutch, and automatic means for rendering said last-named means effective to disengage said clutch only at a predetermined stage in the cycle of operation of the machine.

3. A counter molding machine comprising a plurality of molds cooperable to shape the body portion of a counter blank positioned between them, a flange former movable across the faces of the molds to form flanges upon the blank, means for actuating the molds and flange former including power means and a clutch, automatic means operable intermittently to effect engagement and disengagement of the clutch, and means operable in timed relation to the movement of the flange former to prevent disengagement of the clutch except at a predetermined stage in the movement of the flange former.

4. A counter molding machine comprising a plurality of molds cooperable to shape the body portion of a counter blank positioned between them, a flange former movable across the faces of the molds to form flanges upon the blank, means for actuating the molds and flange former comprising power means, a drive shaft, and a clutch constructed and arranged when in engagement with the power means to cause operation of the molds and flange former from the drive shaft, automatic means for intermittently causing engagement of the clutch, and a member operating in timed relation to the flange former to cause disengagement of the clutch.

5. A counter molding machine comprising a plurality of molds movable to shape a counter blank positioned between them, a flange former movable across the faces of the molds to form flanges upon the blank, a drive shaft for causing operation of the molds and flange former, a clutch for connecting the drive shaft to a source of power, means for controlling the clutch including a latch, a continuously rotatable cam, means operatively connected to the cam for intermittently actuating the latch to cause engagement of the clutch, a member adjacent to the latch but normally out of engagement therewith and movable with the flange former, a second continuously rotatable cam, and means operatively connected to said last-mentioned cam for moving said member into position to engage the latch to effect disengagement of the clutch at a predetermined stage in the cycle of operation of the machine.

LESLIE HUGH BENNION.
WILLIAM ARNOLD SMART.